United States Patent
McHale et al.

(10) Patent No.: US 6,870,834 B1
(45) Date of Patent: Mar. 22, 2005

(54) COMMUNICATION SERVER APPARATUS PROVIDING XDSL SERVICES AND METHOD

(75) Inventors: John F. McHale, Austin, TX (US); Robert H. Locklear, Jr., Austin, TX (US); Robert M. Burke, II, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 938 days.

(21) Appl. No.: 09/662,369

(22) Filed: Sep. 13, 2000

Related U.S. Application Data

(60) Division of application No. 08/891,893, filed on Jul. 14, 1997, which is a continuation-in-part of application No. 08/625,769, filed on Mar. 29, 1996, now Pat. No. 5,668,857.

(51) Int. Cl.[7] .............................................. H04L 12/50
(52) U.S. Cl. ...................... 370/354; 370/229; 370/437; 370/487; 370/490; 375/222
(58) Field of Search ................................ 370/229, 316, 370/351, 352, 354, 430, 431, 437, 462, 463, 486, 487, 489, 490, 493, 494, 537, 538; 358/400, 407; 375/222, 465, 468; 379/93.07, 93.29, 156, 93.14

(56) References Cited

U.S. PATENT DOCUMENTS

| | | | |
|---|---|---|---|
| 3,532,827 A | 10/1970 | Ewin ........................... | 179/18 |
| 3,821,484 A | 6/1974 | Sternung et al. ........ | 179/18 EB |
| 4,002,849 A | 1/1977 | Kotler et al. ............ | 179/18 EB |
| 4,282,408 A | 8/1981 | Stauers .................... | 179/18 FA |
| 4,438,511 A | 3/1984 | Baran .......................... | 370/19 |
| 4,665,514 A | 5/1987 | Ching et al. .................. | 370/60 |
| 4,679,227 A | 7/1987 | Hughes-Hartogs ........... | 379/98 |
| 4,731,816 A | 3/1988 | Hughes-Hartogs ........... | 379/98 |

(List continued on next page.)

FOREIGN PATENT DOCUMENTS

| | | | |
|---|---|---|---|
| JP | 6376648 | 4/1988 | ........... H04L/11/20 |
| WO | WO 97/37458 | 10/1997 | |

OTHER PUBLICATIONS

Horst Hessenmuller, et al. Zugangsnetzstrukturen fur interaktive Videodienste (Teil 1), *Fernmelde Ingenieur, Der*, vol. 48, No. 8, XP000647017, Germany, pp. 1–32 (with English translation), Aug. 1994.

Horst Hessenmuller, et al. Zugangsnetzstrukturen fur interaktive Videodienste (Teil 2), *Fernmelde Ingenieur, Der*, vol. 48, No. 9, XP000619688, Germany, pp. 1–28 (with English translation), Sep. 1994.

*Primary Examiner*—Wellington Chin
*Assistant Examiner*—John Shew
(74) *Attorney, Agent, or Firm*—Baker Botts L.L.P.

(57) ABSTRACT

A communication system (500) includes a plurality of subscriber systems (510) coupled to a plurality of twisted pair data lines (520). Each subscriber system (510) has an availability guarantee value, which may specify a level of service for the subscriber system (510). A communication server (502) is coupled to the plurality of subscriber systems (510). The communication server (502) selectively couples a subscriber system (510), responsive to a request for service, to either a first modem pool (530) or a second modem pool (540) based on the availability guarantee value associated with the subscriber system (510). Communication server (502) can also provide a soft-termination state and dynamic network address allocation for subscriber systems (510).

30 Claims, 7 Drawing Sheets

U.S. PATENT DOCUMENTS

| | | | |
|---|---|---|---|
| 4,757,495 A | 7/1988 | Decker et al. | 370/76 |
| 4,782,512 A | 11/1988 | Hutton | 379/98 |
| 4,833,706 A | 5/1989 | Hughes-Hartogs | 379/98 |
| 4,980,897 A | 12/1990 | Decker et al. | 375/38 |
| 4,985,889 A | 1/1991 | Frankish et al. | 370/94.1 |
| 5,025,469 A | 6/1991 | Bingham | 379/98 |
| 5,054,034 A | 10/1991 | Hughes-Hartogs | 375/8 |
| 5,119,402 A | 6/1992 | Ginzburg et al. | 375/17 |
| 5,119,403 A | 6/1992 | Krishnan | 375/39 |
| 5,134,611 A | 7/1992 | Steinka et al. | 370/79 |
| 5,185,763 A | 2/1993 | Krishnan | 735/39 |
| 5,198,818 A | 3/1993 | Samueli et al. | 341/144 |
| 5,202,884 A | 4/1993 | Close et al. | 370/94.1 |
| 5,206,886 A | 4/1993 | Bingham | 375/97 |
| 5,210,530 A | 5/1993 | Kammerer et al. | 340/825.08 |
| 5,214,650 A | 5/1993 | Renner et al. | 370/110.1 |
| 5,222,077 A | 6/1993 | Krishnan | 375/39 |
| 5,228,062 A | 7/1993 | Bingham | 375/97 |
| 5,247,347 A * | 9/1993 | Litteral et al. | 725/114 |
| 5,282,155 A | 1/1994 | Jones | 364/724.19 |
| 5,285,474 A | 2/1994 | Chow et al. | 375/13 |
| 5,293,402 A | 3/1994 | Crespo et al. | 735/14 |
| 5,295,159 A | 3/1994 | Kerpez | 735/38 |
| 5,331,670 A | 7/1994 | Sorbara et al. | 375/111 |
| 5,337,348 A | 8/1994 | Yamazaki et al. | 379/94 |
| 5,339,355 A | 8/1994 | Mori et al. | 379/94 |
| 5,341,474 A | 8/1994 | Gelman et al. | 395/200 |
| 5,345,437 A | 9/1994 | Ogawa | 370/13 |
| 5,367,540 A | 11/1994 | Kakuishi et al. | 375/103 |
| 5,371,532 A | 12/1994 | Gelman et al. | 348/7 |
| 5,379,441 A | 1/1995 | Watanabe et al. | 395/800 |
| 5,390,239 A | 2/1995 | Morris et al. | 379/93 |
| 5,400,322 A | 3/1995 | Hunt et al. | 370/19 |
| 5,404,388 A | 4/1995 | Eu | 379/24 |
| 5,408,260 A | 4/1995 | Arnon | 348/6 |
| 5,408,522 A | 4/1995 | Ikehata et al. | 379/98 |
| 5,408,527 A | 4/1995 | Tsutsu | 379/211 |
| 5,408,614 A | 4/1995 | Thornton et al. | 395/275 |
| 5,410,264 A | 4/1995 | Lechleider | 327/311 |
| 5,410,343 A | 4/1995 | Coddington et al. | 348/7 |
| 5,412,660 A | 5/1995 | Chen et al. | 370/110.1 |
| 5,414,455 A | 5/1995 | Hooper et al. | 348/7 |
| 5,414,733 A | 5/1995 | Turner | 375/233 |
| 5,422,876 A | 6/1995 | Turudic | 370/15 |
| 5,428,608 A | 6/1995 | Freeman et al. | 370/60.1 |
| 5,440,335 A | 8/1995 | Beveridge | 348/13 |
| 5,442,390 A | 8/1995 | Hooper et al. | 348/7 |
| 5,444,703 A | 8/1995 | Gagliardi et al. | 370/60.1 |
| 5,452,306 A | 9/1995 | Turudic et al. | 370/110.1 |
| 5,453,779 A | 9/1995 | Dan et al. | 348/7 |
| 5,461,415 A | 10/1995 | Wolf et al. | 348/7 |
| 5,461,616 A | 10/1995 | Suzuki | 370/79 |
| 5,461,640 A | 10/1995 | Gatherer | 375/231 |
| 5,469,495 A | 11/1995 | Beveridge | 379/56 |
| 5,475,735 A | 12/1995 | Williams et al. | 379/59 |
| 5,477,263 A | 12/1995 | O'Callaghan et al. | 348/7 |
| 5,479,447 A | 12/1995 | Chow et al. | 375/260 |
| 5,495,483 A | 2/1996 | Grube et al. | 370/95.1 |
| 5,513,251 A | 4/1996 | Rochkind et al. | 379/93 |
| 5,517,488 A | 5/1996 | Miyazaki et al. | 370/16 |
| 5,528,585 A | 6/1996 | Cooley et al. | 370/56 |
| 5,546,379 A * | 8/1996 | Thaweethai et al. | 370/254 |
| 5,574,724 A | 11/1996 | Bales et al. | 370/68.1 |
| 5,583,872 A | 12/1996 | Albrecht et al. | 370/476 |
| 5,598,406 A | 1/1997 | Albrecht et al. | 370/296 |
| 5,602,902 A | 2/1997 | Satterlund et al. | 379/59 |
| 5,604,741 A | 2/1997 | Samueli et al. | 370/402 |
| 5,610,910 A | 3/1997 | Focsaneanu et al. | 370/351 |
| 5,619,505 A | 4/1997 | Grube et al. | 370/476 |
| 5,631,897 A | 5/1997 | Pacheco et al. | 370/237 |
| 5,668,857 A | 9/1997 | McHale | 379/93.07 |
| 5,678,004 A | 10/1997 | Thaweethai | 595/187.01 |
| 5,680,394 A | 10/1997 | Bingham et al. | 370/294 |
| 5,687,176 A | 11/1997 | Wisniewski et al. | 370/476 |
| 5,737,364 A | 4/1998 | Cohen et al. | 375/220 |
| 5,751,701 A | 5/1998 | Langberg et al. | 370/281 |
| 5,756,280 A * | 5/1998 | Soora et al. | 725/146 |
| 5,770,950 A | 6/1998 | Zurcher et al. | 326/30 |
| 5,781,617 A | 7/1998 | McHale et al. | 379/93.14 |
| 5,790,550 A | 8/1998 | Peeters et al. | 370/480 |
| 5,799,017 A | 8/1998 | Gupta et al. | 370/419 |
| 5,812,786 A | 9/1998 | Seazholtz et al. | 395/200.63 |
| 5,822,374 A | 10/1998 | Levin | 375/260 |
| 5,841,842 A | 11/1998 | Baum et al. | 379/93.32 |
| 5,852,604 A | 12/1998 | Cooley et al. | 370/324 |
| 5,852,633 A | 12/1998 | Levin et al. | 375/260 |
| 5,852,655 A | 12/1998 | McHale et al. | 379/93.14 |
| 5,909,463 A | 6/1999 | Johnson et al. | 375/220 |
| 5,987,069 A | 11/1999 | Furukawa et al. | 375/285 |
| 6,002,722 A | 12/1999 | Wu | 375/295 |
| 6,473,438 B1 * | 10/2002 | Cioffi et al. | 370/468 |

* cited by examiner

COMMUNICATION SERVER APPARATUS PROVIDING XDSL SERVICES AND METHOD

CROSS-REFERENCE TO RELATED APPLICATIONS

This application is a divisional of U.S. application Ser. No. 08/891,893, filed Jul. 14, 1997 by John F. McHale, Robert H. Locklear, Jr. and Robert M. Burke, II, pending; which is a continuation-in-part of U.S. application Ser. No. 08/625,769, filed Mar. 29, 1996 by John F. McHale entitled "Communication Server Apparatus and Method," now U.S. Pat. No. 5,668,857, granted Sep. 16, 1997.

TECHNICAL FIELD OF THE INVENTION

This invention relates in general to data communication, and more particularly to a communication server apparatus providing XDSL services and method.

BACKGROUND OF THE INVENTION

A communication server provides access to communication facilities. For example, a communication server having a bank of modems may provide subscriber access to modems for data communication. A communication server may be associated with its own dedicated communication network, or with an existing communication network, such as the public switched telephone network (PSTN).

As communication networks provide greater connectivity and access to information, there is an increasing demand for data communication at higher rates. One solution to provide increased data rates replaces existing twisted pair wiring with high bandwidth media, such as coaxial cables or fiber optic links. Other solutions adopt improved communication techniques using the existing hardware infrastructure. For example, digital subscriber line (XDSL) technology provides higher bandwidth data service over existing twisted pair wiring.

To deliver data service to the subscriber, a communication server may provide a dedicated or permanent connection to its communication facilities. For example, an existing communication server at a central office provides enough communication facilities to simultaneously service all PSTN subscribers. However, all telephone subscribers may not desire data service. Furthermore, the subscribers that desire data service may not simultaneously access the communication server.

SUMMARY OF THE INVENTION

In accordance with the present invention, disadvantages and problems associated with communication servers have been substantially reduced or eliminated. In particular, a communication server apparatus providing XDSL services and a method are disclosed.

In accordance with one aspect of the present invention, a communication system includes a plurality of subscriber systems coupled to a plurality of twisted pair data lines. Each subscriber system has an availability guarantee value, which may specify a level of service for the subscriber. A communication server is provided which is coupled to the plurality of subscriber systems, wherein the communication server selectively couples a is subscriber system to a modem in either a first modem pool or a second modem pool based on the availability guarantee value associated with the subscriber system.

According to another aspect of the present invention, a method is provided for performing an inactivity time-out in an XDSL communication system. A request for service is received from a subscriber, and the subscriber is coupled to a modem in a modem pool to create a subscriber session which establishes a subscriber link. After a time period of inactivity is detected that exceeds a first threshold value, a time-out condition is generated, and the subscriber is placed in a soft-termination state by releasing the modem but maintaining the subscriber link. When activity is detected on the subscriber link, the subscriber is coupled to an available modem in the modem pool and the soft-termination state is canceled. According to another aspect, after a continued time period of inactivity is detected in the soft-termination state that exceeds a second threshold value, a disconnect condition is generated, and the subscriber link is hard-terminated.

According to another aspect of the present invention, a method is provided for dynamically allocating a set of network addresses in an XDSL system. A plurality of requests for service are received from a plurality of subscribers, and each subscriber is coupled to a modem in a modem pool to create a plurality of subscriber sessions. Each of the plurality of subscriber sessions is assigned a network address from a set of assignable addresses. When a network address is assigned from the set of assignable addresses to a subscriber session, it is removed from the set of assignable network addresses. When a subscriber session ends, the network address assigned to that subscriber session is returned to the set of assignable network addresses.

Important technical advantages of the present invention include a communication server that provides data service to a number of subscribers using a reduced number of XDSL communication facilities. Over-subscription of data service is accomplished by selectively coupling a number of twisted pair data lines to a reduced number of XDSL modems. A controller polls the data lines in succession to determine which subscribers of the communication system need data service. Upon detecting a need for data service on a selected data line, the controller directs a switch to couple the selected data line to an available modem. The communication server may then provide data service suitable for high bandwidth applications, such as video-on-demand, multimedia, or Internet access.

Another important technical advantage of the present invention includes a communication server that provides over-subscribed XDSL data service using the existing infrastructure of the public switched telephone network (PSTN). Asymmetric digital subscriber line (ADSL), symmetric digital subscriber line (SDSL), high-speed digital subscriber line (HDSL), very high-speed digital subscriber line (VDSL), or other suitable XDSL technology can provide higher bandwidth data service over existing twisted pair wiring. These technologies may support data service simultaneously with traditional telephone service using a separation technique, such as frequency division multiplexing. In one embodiment, a splitter divides each incoming twisted pair subscriber line into a twisted pair phone line and a twisted pair data line. The phone line is coupled to a telephone switch to provide telephone service and the data line is coupled to the communication server to provide over-subscribed XDSL data service. The communication server and splitter may be located at a central office of the PSTN.

Another important technical advantage of the present invention includes the management and monitoring of XDSL data service provided to subscribers. To accomplish this, the communication server maintains an activity table to determine status information on twisted pair data lines and XDSL modems. In addition, the communication server can track subscriber usage, monitor subscriber information and generate billing and demographic information. In a particular embodiment, an activity detector disconnects a subscriber after a predetermined period of inactivity to release a modem for use by another subscriber.

A further technical advantage of the present invention is the provision of a soft-termination for subscriber links. In addition, subscribers are provided with selectable levels of service that can be modified by the subscriber for designated periods of time. Further, network addresses can be dynamically assigned to subscriber sessions to reduce the total number of available network addresses that are needed. Other important technical advantages are readily apparent to one skilled in the art from the following figures, descriptions, and claims.

BRIEF DESCRIPTION OF THE DRAWINGS

For a more complete understanding of the present invention, and for further features and advantages, reference is now made to the following description taken in conjunction with the accompanying drawings, in which:

FIG. 9 is a flow chart of a method to decouple a data line from a modem in the communication server;

DETAILED DESCRIPTION OF THE INVENTION

Figure 1:
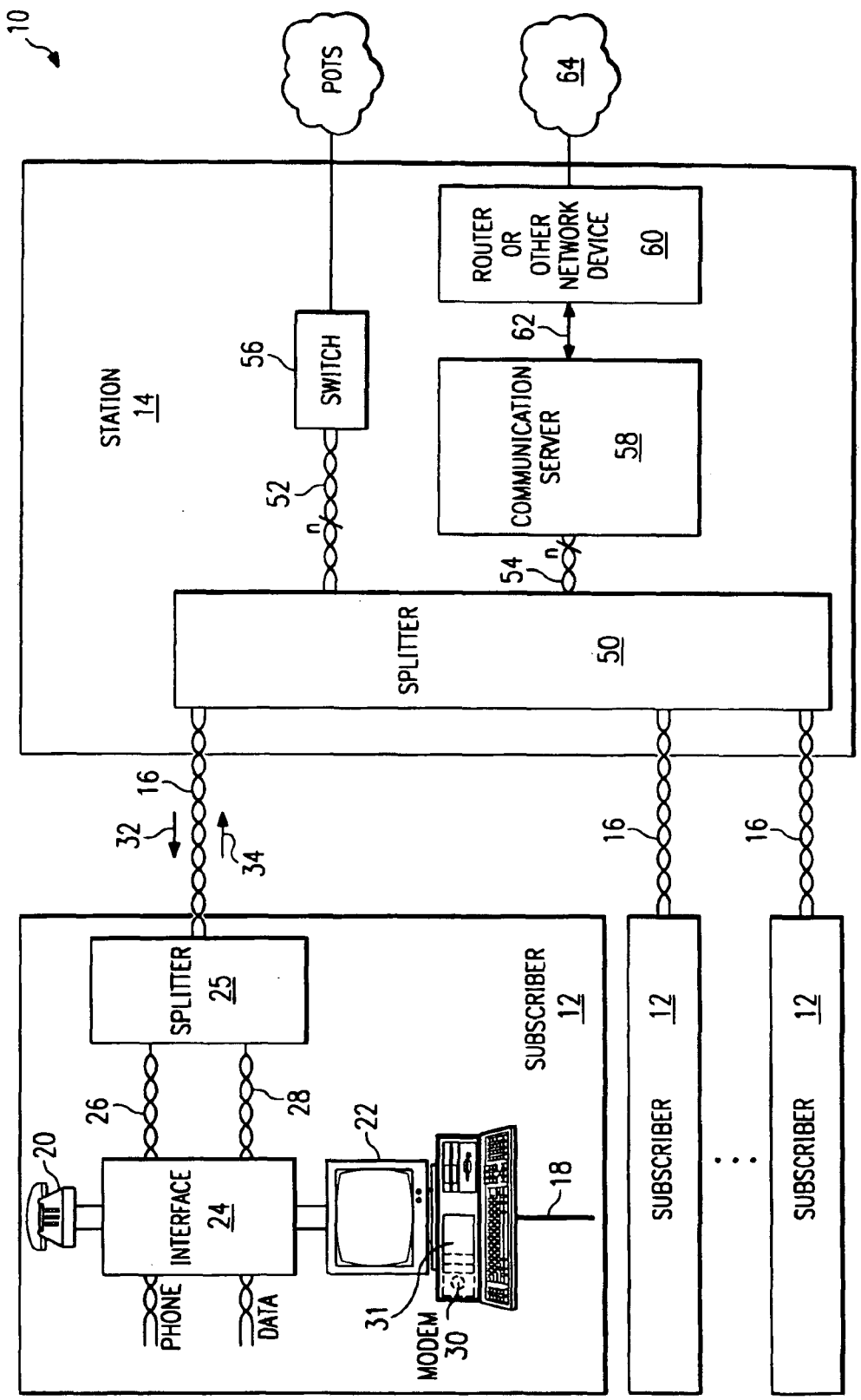
FIG. 1 illustrates a communication system that provides telephone and data service.

FIG. 1 illustrates a communication system 10 that provides both telephone and data service to a subscriber 12. A central office 14 is coupled to subscriber 12 using subscriber line 16. In operation, central office 14 provides telephone and data service to subscriber 12 using subscriber line 16. Subscriber line 16 supports simultaneous telephone and data service using twisted pair wiring.

Subscriber 12 includes a telephone 20 and a computer 22, both coupled to an interface 24. A splitter 25 is coupled to subscriber line 16 and operates to split subscriber line 16 into a twisted pair phone line 26 and a twisted pair data line 28. Phone line 26 is coupled to telephone 20 using interface 24. Similarly, data line 28 is coupled to computer 22 using interface 24. Subscriber 12 refers to one or more components at the subscriber premises shown in FIG. 1, as well as the user of these components.

Telephone 20 is a traditional telephone transceiver, a cordless telephone transceiver, or any other device suitable for allowing communication over telephone line 26. Computer 22 comprises a mainframe device, mini-frame device, server, desktop personal computer, notebook personal computer, or other suitable computing device having an XDSL modem 30 that communicates data using data line 28. Modem 30 couples to other components of computer 22 using a Peripheral Component Interconnect (PCI) bus, an Industrial Standard Architecture (ISA) bus, a Personal Computer Memory Card International Association (PCMCIA) interface, or any other suitable technology that provides input/output capability to computer 22. The selection and design of modem 30 for computer 22 may s depend on the type or functionality of computer 22, as well as the data service rate supported by data line 28.

Modem 30 transmits and receives data in communication system 10 using any suitable digital subscriber line technology, referred to generally as XDSL. Modem 30 also supports Ethernet, Fast Ethernet, V. 35 data protocol, frame relay, asynchronous transfer mode (ATM), switched multi-megabit data service (SMDS), high-level data link control (HDLC), serial line Internet protocol (SLIP), point-to-point protocol (PPP), transmission control protocol/Internet protocol (TCP/IP), or any other appropriate protocol, collectively referred to as digital protocol. For example, computer 22 may include a network interface 31 to receive data from central office 14 or to further communicate data to a local area network (LAN), wide area network (WAN), or other suitable network coupled to computer 22 using link 18. In general, modem 30 translates information between the communication protocol supported by communication system 10 and the digital protocol supported by computer 22.

Communication system 10 includes numerous other twisted pair subscriber lines 16 coupled to other subscribers 12. In an exemplary embodiment, central office 14 provides phone and data service to one thousand subscribers, with each subscriber 12 including one or more components described above at its premises. The subscribers and subscriber lines in communication system 10 are referred to collectively in the plural as subscribers 12 and subscriber lines 16.

Interface 24 couples phone line 26 to telephone 20, and data line 28 to computer 22. In one embodiment, interface 24 provides additional couplings to additional telephones 20 and computers 22 at subscriber 12. Splitter 25 is a passive or active splitter that divides subscriber line 16 into phone line 26 and data line 28 of the same type. Throughout this description, phone line 26 and data line 28 may be referred to specifically, or collectively as part of subscriber line 16.

Subscriber line 16 couples subscriber 12 to central office 14. Subscriber line 16 comprises twisted pair wiring that is commonly installed at subscriber premises and as the local loop in many public switched telephone networks (PSTNs). Subscriber line 16 may be unshielded twisted pair (UTP), shielded twisted pair (STP), or other suitable type or category of twisted pair wiring made of copper or other suitable material. Phone line 26 and data line 28 associated with subscriber line 16 may be the same or different type or category of twisted pair wiring.

Central office 14 includes a splitter 50 coupled to subscriber line 16. Like splitter 25 at subscriber 12, splitter 50 at central office 14 is a passive or active splitter that divides subscriber line 16 into a twisted pair phone line 52 and a twisted pair data line 54. Phone line 52 and data line 54 associated with subscriber line 16 may be the same or different type or category of twisted pair wiring. A telephone switch 56 at central office 14 is coupled to phone line 52 to provide plain old telephone system (POTS) service to subscriber 12. Telephone switch 56 also represents other components in the PSTN or other suitable voice communication network, such as switches, wireline or wireless links, satellites, microwave uplinks, and other communication facilities to deliver telephone service to subscriber 12.

A communication server 58 is coupled to splitter 50 using data line 54. As described in detail below, communication server 58 manages the provisioning of data service to subscriber 12. Communication server 58 performs off-hook detection to determine if subscriber 12 desires data service. Specifically, communication server 58 couples a modem to subscriber line 16 upon detecting a need for data service from computer 22. Communication server 58 tracks subscriber usage, monitors subscriber information, and generates billing and demographic information, as described below.

The data off-hook detector in communication server 58 can use one of several methods to determine whether subscriber 12 should be connected to an XDSL modem. The off-hook detector may monitor direct current voltages, electrical tones, data link frames, or any other protocol or data sequencing to determine whether subscriber 12 needs data access. The off-hook detector in communication server 58 may monitor electrical tones generated by modem 30 while in the process of training, notching, equalizing, or performing any other task that puts electrical tones onto subscriber line 16 and its associated data line 54. Communication server 58 may also detect frames or packets. These frames or packets could be Ethernet, ATM, HDLC, or any suitable data communications frame format. The off-hook detector in communication server 58 could also examine various protocols such as TCP/IP, PPP, or any other suitable network protocol or data stream.

Communication server 58 multiplexes modem digital outputs into a multiplexed digital line 62 for delivery to a router or other network device 60. In one embodiment, multiplexed digital line 62 carries a single bidirectional and multiplexed signal for all subscribers 12 in communication system 10. Signals on multiplexed digital line 62 may support any appropriate digital protocol used by network device 60. A communication network 64, such as a global communication network like the Internet, is coupled to network device 60. Communication network 64 may also include a synchronous optical network (SONET), a frame relay network, an asynchronous transfer mode (ATM) network, a T1, T3, E1, or E3 network, or any other suitable communication network.

One important technical advantage of the present invention is the ability to over-subscribe the XDSL communication facilities of communication server 58 to service an increasing number of subscribers 12 in communication system 10. Communication server 58 may couple to the same number and type of data lines 54 as represented by subscriber lines 16 in communication system 10. For example, if central office 14 services one thousand subscribers 12 using twisted pair subscriber lines 16, then data lines 54 coupled to communication server 58 may represent as many as one thousand twisted pair lines.

In one embodiment, not all subscribers 12 in communication system 10 desire access to data service provided by communication server 58. Splitter 50 need not provide a separate data line 54 for those subscribers 12 that only desire phone service from is telephone switch 56. As more subscribers 12 desire access to data service, the XDSL communication capabilities of splitter 50 and communication server 58 may be supplemented in a modular and cost effective manner to meet the demand.

Communication system 10 supports data service over subscriber lines 16 using asymmetric digital subscriber line (ADSL), symmetric digital subscriber line (SDSL), high-speed digital subscriber line (HDSL), very high-speed digital subscriber line (VDSL), or any other suitable technology that allows high rate data service over twisted pair wiring. All of these technologies are referred to collectively as XDSL or communication protocol. In one embodiment, subscriber line 16 and components of subscriber 12 and central office 14 support communication using ADSL techniques that comply with ANSI standard T1.413. In another embodiment, ADSL communication over subscriber line 16 may be performed using the carrier-less amplitude phase modulation (CAP) technique developed by AT&T Corporation.

In an ADSL communication system, the downlink data rate 32 from central office 14 to subscriber 12 is greater than the uplink data rate 34 from subscriber 12 to central office 14. This allows high bandwidth communication to subscriber 12, while still providing lower bandwidth communication to central office 14. ADSL communication is well-adapted for applications, such as video-on-demand, multimedia, and Internet access, that transfer large volumes of information to subscriber 12 in response to shorter requests for information. In one specific embodiment, downlink data rate 32 is approximately 1.5 Mbps, whereas uplink data rate 34 is approximately 750 kbps. In other embodiments, downlink data rate 32 may be six Mbps or more depending on the specific XDSL technology employed, the quality and length of subscriber line 16, and the contribution of noise and distortion from other components in communication system 10.

XDSL technology provides data service using existing subscriber lines 16 without interrupting normal telephone service. This is accomplished by a separation technique, such as frequency division multiplexing (FDM), to separate frequencies that provide telephone service from those frequencies that provide data service. Dynamic noise cancellation techniques and a guard band between the data and phone service frequencies ensure reliable and simultaneous access to data and phone service over subscriber line 16. For example, subscriber 12 may simultaneously engage in both a data communication session using computer 22 and a voice conversation using telephone 20.

In operation, communication system 10 provides phone and data service to subscriber 12. Subscriber 12 accesses phone service by using telephone 20 to initiate a call. Upon going off-hook, communication system 10 establishes a circuit between telephone 20 and telephone switch 56 using interface 24, phone line 26, splitter 25, subscriber line 16, splitter 50, and one of phone lines 52. Upon establishing this telephone circuit, subscriber 12 using telephone 20 receives POTS service from telephone switch 56.

To access data service, subscriber 12 turns on computer 22, executes a program, such as an Internet browser, or performs some other affirmative or passive activity that generates a request, command, data packet, electrical tone, or other suitable information or signal that indicates a need for data service. In one embodiment, modem 30 repetitively transmits the need for data service in a request interval, where the request interval comprises the time length of the request and the silent interval until the next request. Alternatively, the need for data service indicated at subscriber 12 may be based on the establishment of a closed circuit between subscriber 12 and central office 14 or on one or more analog or digital signal transitions. Modem 30 communicates the need to communication server 58 at central office 14 using interface 24, data line 28, splitter 25, subscriber line 16, splitter 50, and one of data lines 54.

As described in detail below, communication server 58 detects the need for data service and selects an XDSL modem at communication server 58 to communicate with XDSL modem 30 in computer 22. Upon establishing a modem connection between modem 30 in computer 22 and a selected modem in communication server 58, subscriber 12 engages in a data communication session with communication network 64 using network device 60. In addition, computer 22 may function as a gateway into communication network 10 for other devices coupled to network interface 31 using link 18.

XDSL technology allows simultaneous use of subscriber line 16 for both phone and data service using the existing twisted pair wiring in communication system 10. In one embodiment, splitter 50, communication server 58, and network device 60 are located at central office 14 to provide an efficient and modular provisioning of XDSL data service to subscribers 12. However, splitter 50, communication server 58, and network device 60 may be located outside central office 14 without departing from the scope of the present invention.

Figure 2:
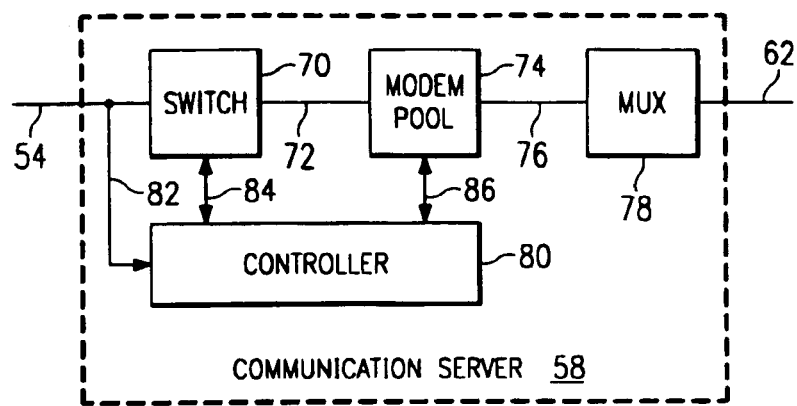
FIG. 2 illustrates a communication server in the communication system.

FIG. 2 illustrates in more detail communication server 58. Data lines 54 associated with subscriber lines 16 are coupled to a switch 70. In one embodiment, each data line 54 corresponds to an associated subscriber line 16 and its related subscriber 12. Switch 70 couples selected data lines 54 to output lines 72 that in turn couple to modem pool 74. The format of signals on data lines 54 and output lines 72 is the same as the format of signals on subscriber lines 16. For example, if communication system 10 adopts XDSL technology, signals on data lines 54 and output lines 72 are modulated using XDSL techniques.

Modems in modem pool 74 convert signals in an appropriate XDSL communication protocol into digital data in an appropriate digital protocol on digital lines 76. A multiplexer 78 is coupled to digital lines 76 and combines the signals on digital lines 76 into a fewer number of multiplexed digital lines 62. In one embodiment, multiplexer 78 combines information for delivery to network device 60 using a single multiplexed digital line 62.

A controller 80 is coupled to data lines 54 using a link 82. Controller 80 is also coupled to switch 70 and modem pool 74 using links 84 and 86, respectively. Controller 80 detects a need for data service generated by subscribers 12 and communicated over subscriber lines 16 to data lines 54. In response, controller 80 using link 84 directs switch 70 to couple a selected subset of data lines 54 to selected output lines 72 that couple to modems in modem pool 74. For example, controller 80 may monitor one thousand data lines 54 to provide XDSL data services using one hundred modems in modem pool 74.

Controller 80 also receives information from modem pool 74 using link 86 to determine status information of modems in modem pool 74. As digital lines 76 become inactive for a predetermined period of time, modem pool 74 detects this inactivity and generates a timeout indication for communication to controller 80. Upon receiving the timeout indication, controller 80 releases the inactive modem in modem pool 74 for later use.

In operation, communication server 58 detects a need for data service on a selected data line 54. This need may be indicated by current voltages, electrical tones, data link frames, packets, or any other suitable analog or digital protocol or data sequencing. Controller 80 detects the need using link 82 and configures switch 70 to provide a coupling between the selected data line 54 and one of the output lines 72 coupled to a selected modem pool 74. The selected modem translates bidirectional communication between a communication protocol on output line 72 and a digital protocol on digital line 76. Multiplexer 78 translates information between digital lines 76 and one or more multiplexed digital lines 62.

Figure 3:
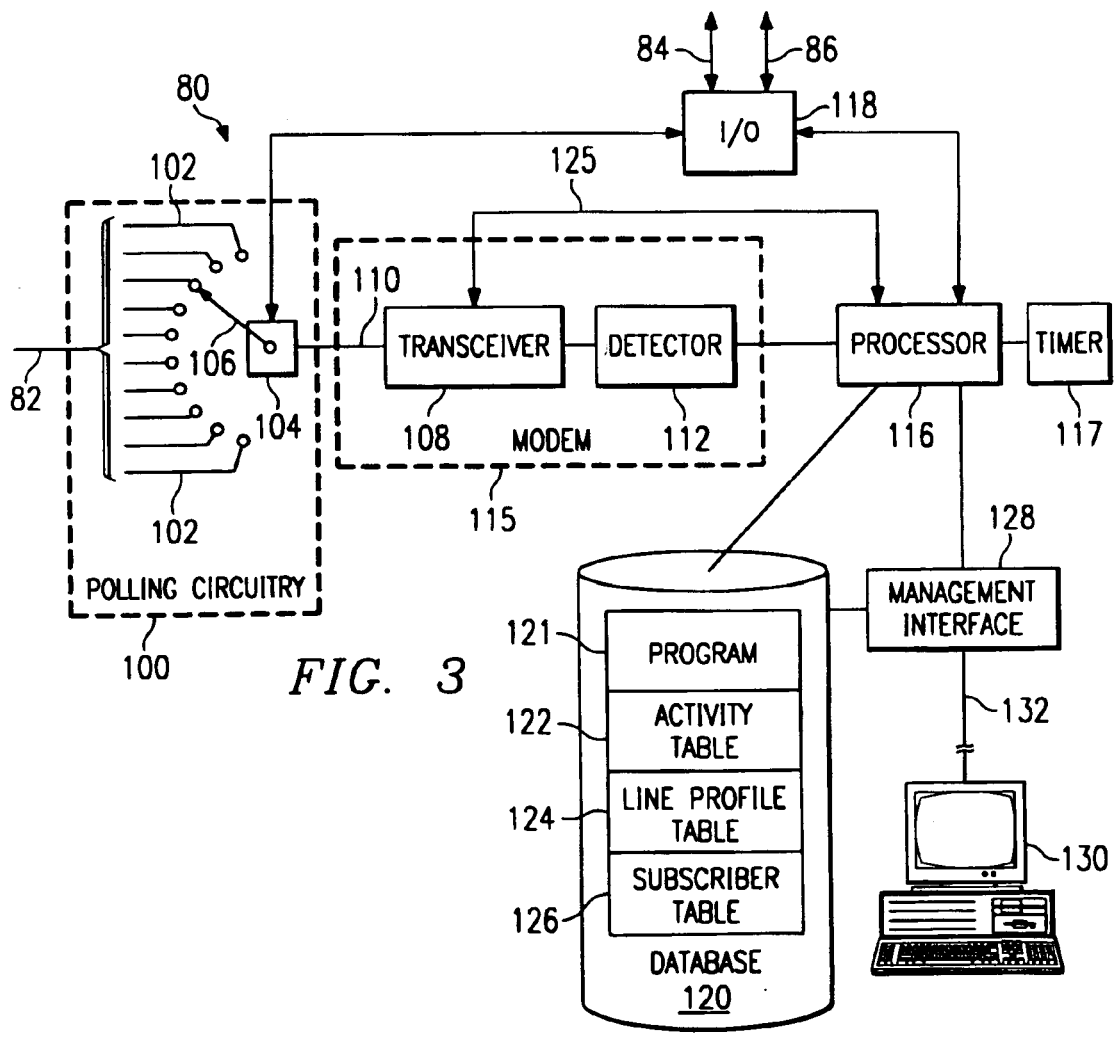
FIG. 3 illustrates in more detail the controller of the communication server.

FIG. 3 illustrates in more detail controller 80. Data lines 54 through link 82 are coupled to polling circuitry 100. In one embodiment, polling circuitry 100 includes a number of terminals 102 corresponding to each data line 54. A switch 104 having a conductive probe 106 contacts terminals 102 to sample the signal on the associated data line 54. Polling circuitry 100 may comprise electromagnetic components, such as a relay or switch, solid state circuitry, or both. It should be understood that the present invention embodies any polling circuitry 100 that allows successive or selective sampling of data lines 54.

Transceiver 108 receives a selected signal 110 from polling circuitry 100. A detector 112 is coupled to transceiver 108, which in turn is coupled to processor 116. Detector 112 may include a media access controller (MAC) and associated memory to detect and store frames or packets of an appropriate digital protocol. Detector 112 may also include less complicated circuitry to detect current voltages, electrical tones, data bit transmissions, or other analog or digital information generated by transceiver 108.

Transceiver 108 and detector 112 may collectively be represented as modem 115, as indicated by the dashed line. Modem 115 provides an interface between the XDSL communication protocol of communication system 10 and processor 116. Modem 115 also includes similar components and performs similar functions as modem 30 in computer 22 to enable modem 30 and modem 115 to exchange information using XDSL technology. Throughout this discussion, the term detector may refer to detector 112 or collectively modem 115.

A processor 116 is coupled to detector 112 and controls the overall operation of controller 80. A timer 117 is coupled to processor 116. Processor 116 is coupled to input/output circuitry 118, which in turn is coupled to switch 70 and modem pool 74 using links 84 and 86, respectively. Processor 116 is also coupled to switch 104 of polling circuitry 100 using input/output circuitry 118. In one embodiment, processor 116 controls the data line selection, dwell time, and other suitable parameters of polling circuitry 100.

Processor 116 is also coupled to database 120 that includes a program 121, an activity table 122, a line profile table 124, and a subscriber table 126. Database 120 stores information as one or more tables, files, or other data structure in volatile or non-volatile memory. All or a portion of database 120 may reside at controller 80, within communication server 58, within central office 14, or at another location in communication system 10. For example, several communication servers 58 in one or more central offices 14 can access database 120 stored in a central location to provide more intelligent management and provisioning of XDSL data service in communication system 10. One or more central offices 14 may be coupled together and the resources of their associated communication servers 58 shared using simple network management protocol (SNMP) techniques.

Program 121 contains instructions to be executed by processor 116 to perform the functions of controller 80. Program 121 may reside in database 120 as shown or may be integral to memory components in transceiver 108, detector 112, and/or processor 116. Program 121 may be written in machine code, pseudocode, or other appropriate programming language. Program 121 may include modifiable source code and other version control features that allow modification, debugging, and enhancement of the functionality of program 121.

Activity table 122, described in more detail below with reference to FIG. 7, maintains status information on data lines 54, switch 70, and output lines 72. In particular, activity table 122 contains information on inactive and active data lines 54, data lines 54 corresponding to current valid subscribers 16 of XDSL data service, and the mapping performed by switch 70 between data lines 54 and output lines 72. Moreover, activity table 122 includes information that specifies the inactivity of a modem in modem pool 74, the status of a data line 54 as dedicated, and any other suitable information that enables processor 116 to monitor and control the operation of switch 70 and modem pool 74.

Profile table 124 stores profile information on data lines 54. This profile information reflects electrical or physical characteristics of data line 54, its associated subscriber line 16 and data line 28, intervening components such as interface 24, splitter 25, splitter 50, and polling circuitry 100, as well as any other component or factor that effects the performance or electrical characteristics of signals received on data lines 54. Processor 116 may access profile table 124 and provide profile information to transceiver 108 using link 125. Alternatively, transceiver 108 may be a more robust and broadband device that does not need profile information from profile table 124. Processor 116 may also provide profile information to program XDSL modems in modem pool 74 once a coupling is made to a selected data line 54. The existence and complexity of profile information in profile table 124 depends on the requirements of transceiver 108 and XDSL modems in modem pool 74, as well as the complexity of signals that indicate a need for data service from subscriber 12.

Subscriber table 126 stores subscriber information indexed by one or more identifiers of subscriber 12, computer 22, modem 30, subscriber line 16, or other information that associates data line 54 with a particular subscriber 12. Subscriber table 126 includes subscriber connect times, session duration, session activity, session logs, billing data, subscriber account information, and any other suitable subscriber information. This information may be summarized and additional information included to generate billing and demographic data on subscribers 12 in communication system 10.

For example, subscriber table 126 may maintain summary statistics on the number of subscribers 12 served by communication server 58, the average connect time, load factors, time-of-day connection profiles, and other statistics to assess the communication facilities to be deployed at communication server 58, the over-subscription ratio that can be supported by communication system 10, and other provisioning and management issues. Furthermore, subscriber table 126 may combine subscriber information from one or more communication servers 58 in one or more central offices 14 in communication system 10.

Management interface 128 is coupled to processor 116 and database 120 and allows external access to the functionality of processor 116. Management interface 128 is also coupled to database 120, which allows modification of program 121, as well as remote access and modification of information in activity table 122, profile table 124, and subscriber table 126. In one embodiment, the telephone service provider or other entity that operates central office 14 or communication system 10 accesses management interface 128 to provide management and control over the operations of controller 80 and communication server 58. For example, the telephone service provider uses management interface 128 to access activity table 122 and/or subscriber table 126 to update the valid subscribers 12 that have access to communication server 58. A local or remote computer 130 is coupled to program interface 128 using an appropriate data link 132, such as a serial RS-232 link, to provide this management feature.

In operation, modem 30 in computer 22 indicates a need for data service, and communicates this need to an associated data line 54 using interface 24, data line 28, splitter 25, subscriber line 16, and splitter 50. In one embodiment, modem 30 transmits successive requests at a predetermined request interval. Processor 116 accesses activity table 122 to determine which data lines 54 to poll, depending on the active or inactive status of the data line 54, whether subscriber 12 corresponding to data line 54 is a current and valid subscriber, and other appropriate considerations. For example, activity table 122 may indicate valid and non-dedicated subscribers 12 to poll.

Polling circuitry 100 successively polls selected data lines 54, as directed by processor 116, using link 82 to detect a need for data service. For each data line 54 polled, processor 116 may access profile table 124 in database 120 and provide associated profile information to transceiver 108 using link 125. Polling circuitry 100 dwells on each data line 54 for a predetermined polling interval to detect a need. In one embodiment, the polling interval is at least two times a request interval of modem 30.

Upon detecting the need for data service associated with a selected data line 54 from polling circuitry 100, transceiver 108 may translate the information from the selected XDSL communication protocol employed on subscriber line 16 into digital or analog data for detection by detector 112. A media access controller (MAC) in detector 112 may transform serial digital data from transceiver 108 into a parallel digital format. Detector 112 receives the information translated by transceiver 108, and stores this information in a suitable memory location for access by processor 116. Processor 116 periodically accesses detector 112 to determine if a need for data service has been detected.

Upon detecting a need for data service, processor 116 accesses database 120 to determine the availability and status of modems in modem pool 74. Processor 116 selects an available modem from modem pool 74. Processor 116 then directs switch 70 to make the appropriate coupling between selected data line 54 and output line 72 coupled to the selected modem. Upon establishing coupling between modem 30 in computer 22 at subscriber 12 and a selected modem in modem pool 74, controller 80 continues to monitor the remaining data lines 54 using polling circuitry 100.

Processor 116 can transmit status or connection information to modem 30 in computer 22 using transceiver 108. This may be performed before, during, or after coupling the selected modem in modem pool 74 to data line 54. For example, processor 116 may send acknowledgment information to modem 30 that includes an indication that a modem is or is not available, an identification of the available modem, a time interval before modem 30 should attempt communication with the selected modem in modem pool 74, or any other suitable information. Furthermore, processor 116 may access information from subscriber table 126, such as billing and account information, historical connection information, or other suitable subscriber information, and transmit this information separate to or as part of the acknowledgment information described above.

Processor 116 may also transmit connection information and updated billing and subscriber information to modem 30 at computer 22 using link 86 and the associated XDSL modem in modem pool 74. This information may include the length of the current session, the current balance in the account of subscriber 12, as well as any other suitable information that relates to the account or activity of subscriber 12 with communication server 58. Generally, processor 116 may communicate any suitable information stored at or made available to controller 80 to subscribers 12 using transceiver 108 or the associated modem in modem pool 74.

Figure 4:
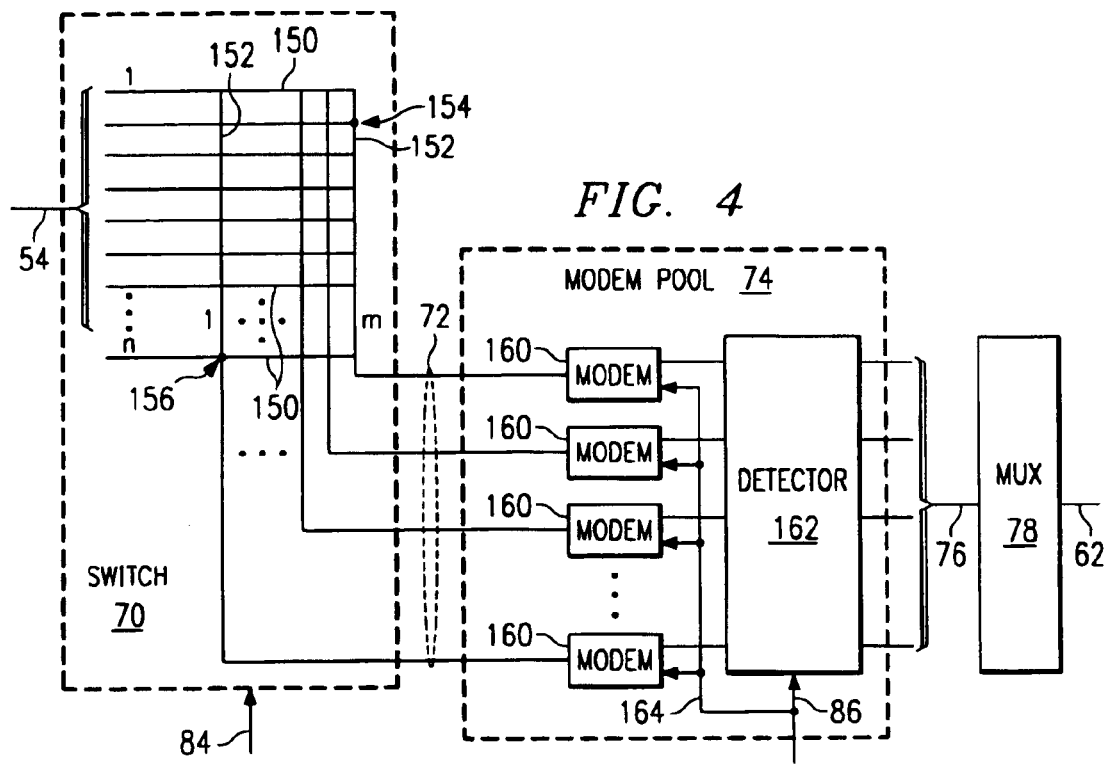
FIG. 4 illustrates in more detail the switch and modem pool of the communication server.

FIG. 4 illustrates in more detail switch 70 and modem pool 74 of communication server 58. Data lines 54 are coupled to switch 70, now shown in more detail as a cross-bar or cross-point matrix switch. In this particular embodiment, data lines 54 correspond to lines 150, and output lines 72 correspond to lines 152 in switch 70. The number of lines 150 (n) is greater than 20 the number of lines 152 (m). This allows switch 70 to couple selected data lines 54 to a reduced number of output lines 72 to provide an over-subscription of XDSL data service in communication system 10. For example, switch 70 couples the second of lines 150 to the last of lines 152 by establishing connection 154. Similarly, switch 70 couples the last of lines 150 and the first of lines 152 by establishing connection 156.

Although switch 70 is shown in FIG. 4 to be a cross-bar or cross-point matrix switch, it should be understood that any device that can couple a number of data lines 54 to a reduced number of output lines 72 may be used. Switch 70 may incorporate electromagnetic components, such as relays and contacts, or may be implemented in whole or in part using one or more solid state devices.

Modem pool 74 includes XDSL modems 160 associated with output lines 72 from switch 70. Modems 160 translate information between an appropriate XDSL communication protocol on output lines 72 and an appropriate digital protocol on digital lines 76. In one embodiment, modems 160 may be similar in construction and operation to modem 30 at subscriber 12. A detector 162 coupled to modems 160 detects the activity of modems 160 to determine if the line has become inactive for a predetermined interval of time. For example, if one of the modems 160 does not display activity over a five-minute interval, detector 162 generates a timeout indication to notify processor 116 of the inactive modem. Processor 116 releases or decouples the inactive modem for later subscriber sessions. In one embodiment, detectors 162 may include one-shot timers or other retriggerable timers set for a predetermined time interval to detect the inactive status of modems 160.

Detector 162 is a monitoring circuit that passes through the digital output of modems 160 to digital lines 76 for presentation to multiplexer 78. Multiplexer 78 may combine signals from digital lines 76 into a single multiplexed digital line 62. Alternatively, multiplexer 78 may employ any suitable reduction ratio that places signals on digital lines 76 on a fewer number of multiplexed digital lines 62.

Processor 116 may directly communicate with modems 160 using link 164. For example, link 164 allows processor 116 to program modems 160 with profile information retrieved from profile table 124. Link 164 also supports communication between processor 116 and selected subscribers 12 during an active subscriber session using modems 160. Moreover, link 164 allows processor 116 to monitor the information received from and transmitted to subscribers 12 during a communication session.

In operation, switch 70 couples a selected subset of data lines 54 to output lines 72 in response to signals received from controller 80 using link 84. Each of the output lines 72 is coupled to an associated modem 160 which translates the information formatted in an analog communication protocol, such as XDSL, into an appropriate digital signal. The digital information output from modems 160 passes through detector 162, which monitors the activity on the output line of modems 160. If detector 162 senses inactivity over a predetermined interval, a timeout indication is provided to processor 116 using link 86. Signals on digital lines 76 may be reduced to fewer multiplexed digital lines 62 using multiplexer 78.

Figure 5:
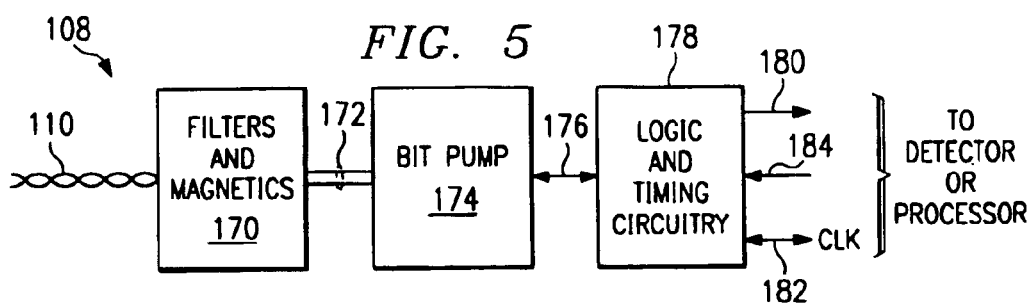
FIG. 5 illustrates in more detail the transceiver in the controller of the communication server.

FIG. 5 illustrates in more detail transceiver 108 in controller 80. To receive information, transceiver 108 includes filters and magnetics 170 to condition the signal from selected data line 54. The conditioned signal is provided over differential lines 172 to analog bit pump 174. Bit pump 174 performs the specific demodulation technique for the chosen XDSL communication protocol. For example, bit pump 174 may execute a discrete multi-tone demodulation (DMT) or carrierless amplitude phase demodulation (CAP) to demodulate an XDSL signal on differential lines 172 into a digital stream on line 176. Logic and timing circuitry 178 contains decode logic, timing and synchronization circuitry, steering logic, and other appropriate digital processing circuitry to produce a data signal on receive data line 180 and a corresponding clock signal on clock line 182 for delivery to detector 112 or processor 116. Detector 112 may include a MAC to support any digital protocol or signal detection that indicates a need for XDSL data service. The data may be in non-return-to-zero format or any other suitable format.

To transmit information, transceiver 108 receives a data signal on transmit data line 184 from detector 112 or processor 116. Using the clock line 182, logic and timing circuitry 178 digitally processes signals received on transmit data line 184 for delivery to analog bit pump 174. Using an appropriate modulation technique, such as DMT or CAP, analog bit pump 174 produces an analog signal for delivery over differential lines 172 to filters and magnetics 170 for transmission over selected data line 54.

Figure 6:
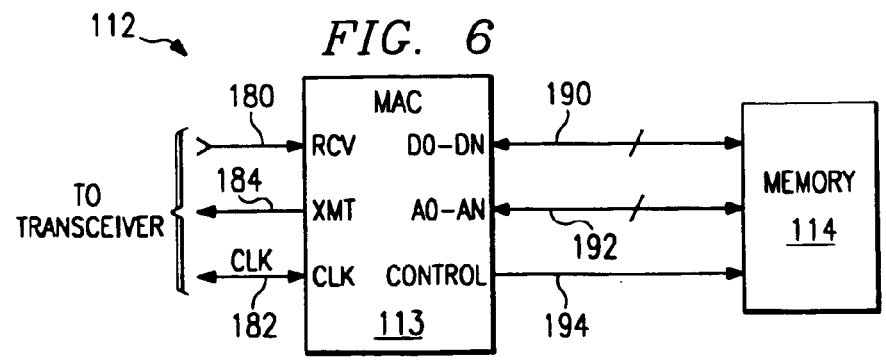
FIG. 6 illustrates in more detail the detector in the controller of the communication server.

FIG. 6 illustrates in more detail a specific embodiment of detector 112 that includes a MAC 113 and a memory 114. MAC 113 is coupled to receive data line 180 and clock line 182, and translates received data from a serial data format, such as a non-return-to-zero format, into an appropriate parallel digital format. MAC 113 translates the data from the chosen digital protocol and provides the data to memory 114 using data bus 190. MAC 113 also provides an address to memory 114 using address bus 192 to specify the location in memory 114 to store data provided on data bus 190. In addition, MAC 113 provides a write signal to memory 114 using control line 194.

To transmit data, MAC 113 provides a read signal to memory 114 using control line 194, and an associated address of the data to be read using address bus 192. In response, memory 114 provides the requested data on data bus 190. MAC 113 translates the data into the selected. digital protocol for placement on transmit data line 184.

Figure 7:
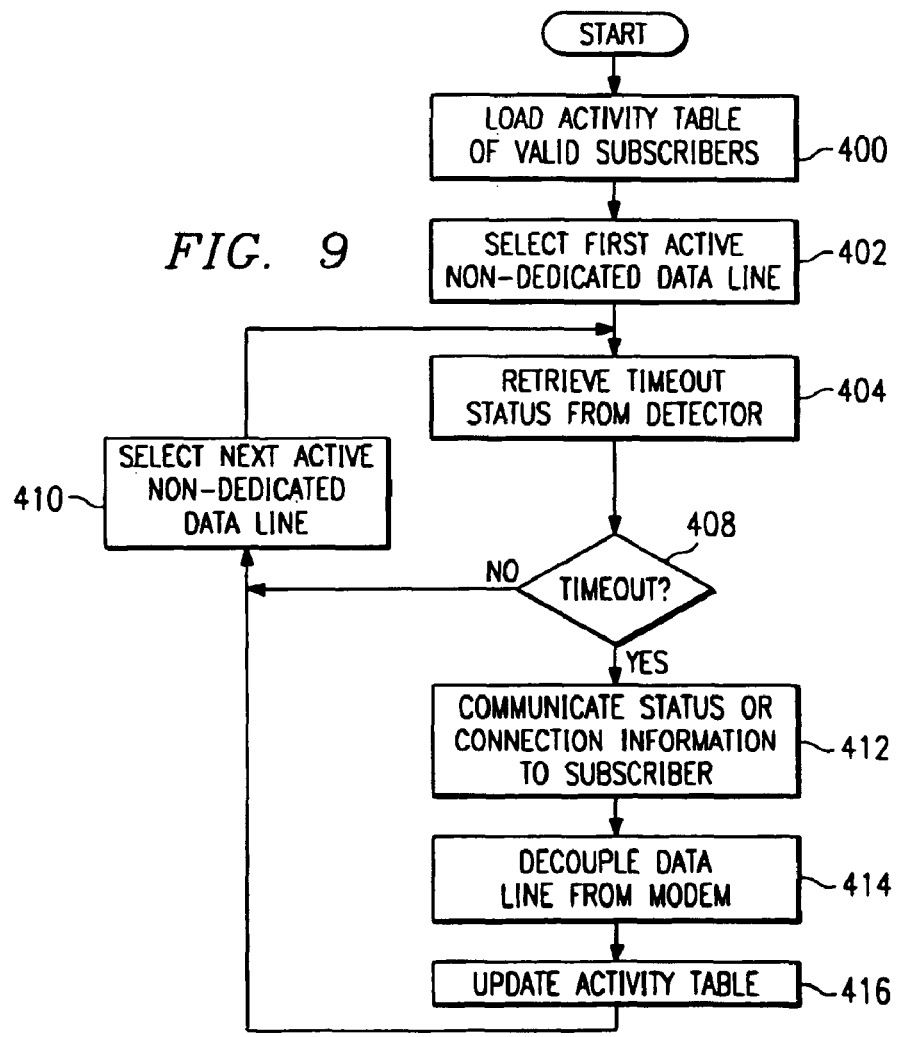
FIG. 7 illustrates an activity table used by the controller of the communication server.

FIG. 7 illustrates one embodiment of activity table 122 stored in database 120 of controller 80.

Processor 116 accesses and modifies entries in activity table 122 to direct the operation of controller 80. In addition, management interface 128 provides external access to activity table 122. For example, a telephone service provider using management interface 128 can add, delete, or otherwise modify entries in activity table 122 to maintain a listing of valid subscribers 12. Database 120 stores some or all of the status information shown in this exemplary activity table 122, as well as other information that may be used by processor 116 to direct the activities of controller 80.

Activity table 122 includes a data line column 200 that contains an address or other appropriate identifier of data lines 54 associated with subscriber lines 16 and their related subscribers 12. Status column 202 indicates the status of data line 54 identified in data line column 200. For example, status column 202 may contain one or more indications that the associated data line 54 is inactive (I), active (A), or dedicated (D). A timeout column 204 indicates whether detector 162 in modem pool 74 has detected a timeout associated with a particular data line 54. A modem column 206 includes an identifier of the modem 160 associated with the corresponding data line 54.

An entry in activity table 122 corresponds to a row that designates a selected data line 54 in data line column 200, the status of the selected data line 54 in status column 202, a timeout indication of the selected data line 54 in timeout column 204, and the modem associated with the selected data line 54 in modem column 206. For example, entry 208 relates to data line "D1" which is inactive. Entry 210 represents data line "D2" which is inactive but dedicated to modem "M1." Entry 212 indicates that data line "D4" is active, coupled to modem "M3," but a timeout indication has been detected.

Subscribers 12 indicated in status column 202 as dedicated may be serviced by communication server 58 in a specific way. Switch 70 in communication server 58 maintains a coupling between data line 54 corresponding to dedicated subscriber 12 and its associated and dedicated modem 160. In this manner, controller 80 need not detect a need for data service or reconfigure the couplings for data line 54 corresponding to dedicated subscriber 12. In this manner, communication server 58 provides the option of a different class of service for a dedicated subscriber 12 that desires uninterrupted access to XDSL communication facilities.

Figure 8:
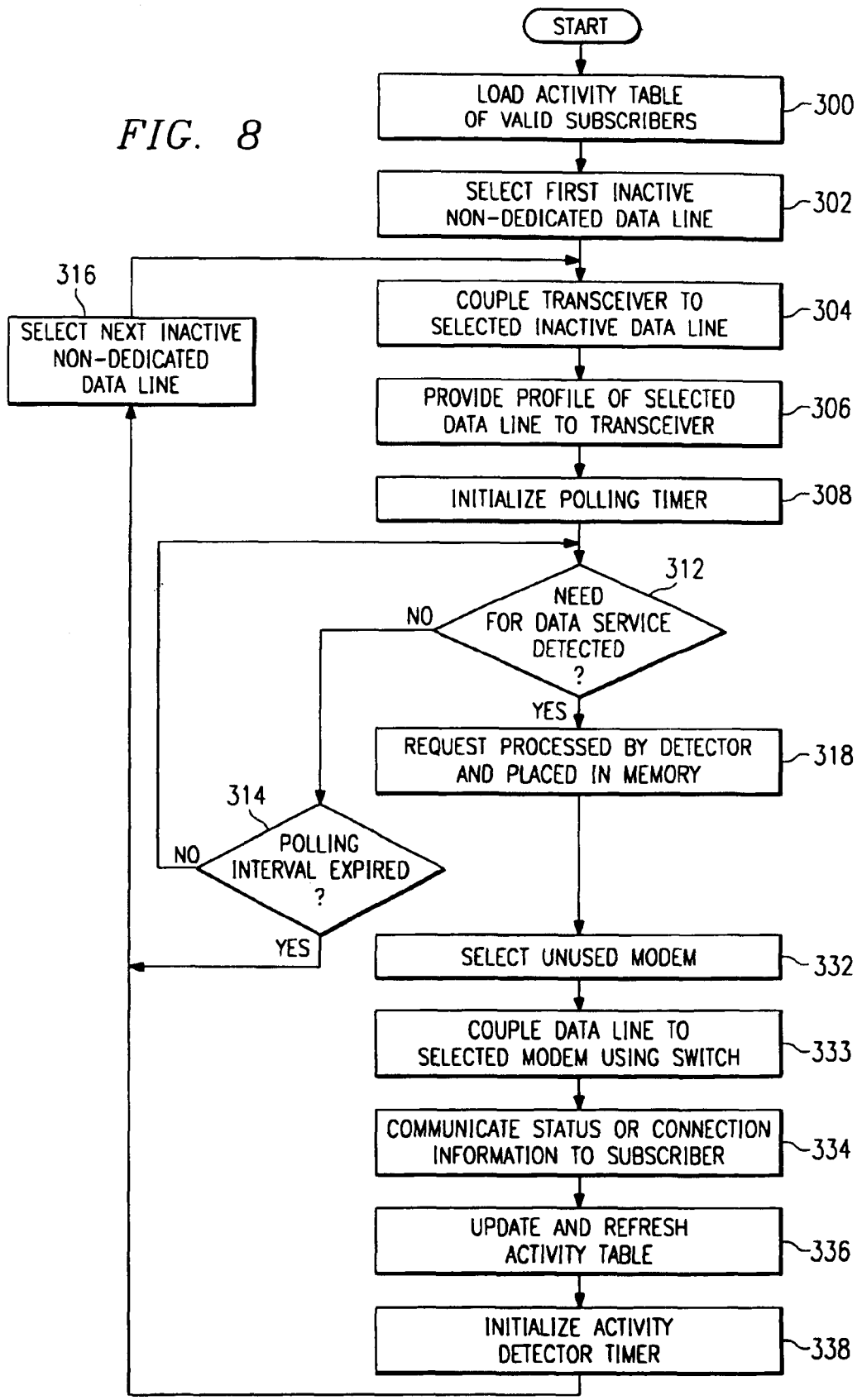
FIG. 8 is a flow chart of a method for coupling a data line to a modem in the communication server.

FIG. 8 is a flow chart of a method performed at controller 80 to couple data lines 54 to modems 160 in modem pool 74. The method begins at step 300 where processor 116 of controller 80 loads activity table 122 from database 120 which contains an entry for each valid subscriber 12 served by communication server 58. Using management interface 128, a telephone service provider may ensure that activity table 122 reflects valid subscribers 12 by monitoring past due accounts, the overuse of data service, successive invalid attempts to access communication server 58, or other factors that may cause subscribers 12 to be invalid. Processor 116 selects the first inactive and non-dedicated data line 54 indicated by the designation "I" in status column 202 of activity table 122. Since switch 70 is configured to continuously couple dedicated subscribers 12 to their dedicated modems 160, processor 116 need not select an inactive data line 54 that is also dedicated, as indicated by the designation "I/D" in status column 202.

Using input/output circuitry 118, processor 116 directs switch 104 of polling circuitry 100 to couple transceiver 108 to the selected inactive and non-dedicated data line 54 at step 304. If appropriate, processor 116 accesses profile table 124 in database 120 and provides profile information for the selected data line 54 to transceiver 108 using link 125 at step 306. Processor 116 initializes timer 117 with a predetermined polling interval at step 308.

If a need for data service has not been detected by transceiver 108 at step 312, then processor 116 checks timer 117 at step 314. If the polling interval monitored by timer 117 has not expired at step 314, then processor 116 again determines if a need has been detected at step 312. However, if the polling interval monitored by timer 117 has expired at step 314, processor 116 selects the next inactive and non-dedicated data line 54 as indicated in status column 202 of activity table 122 at step 316, and returns to step 304.

If a need for data service is detected at step 312, the associated information may be further processed by detector 112 and placed in memory for access by processor 116 at step 318. Before, during, or after step 318, transceiver 108, detector 112, and/or processor 116 may validate the need for data service. Validation may be performed at a low level, such as a verification of the checksum or detection of an incomplete transmission, or at a higher level, such as a verification of an identifier, password, or other security information that provides access to communication server 58. Validation contemplates any level of validation or security handshake that confirms that the received need is valid and accepted by controller 80.

Upon selecting an unused modem at step 332, processor 116 generates a command that directs switch 70 to couple the selected data line 54 to the selected modem 160 at step 333. Processor 116 may communicate status or connection information to subscriber 12 using transceiver 108 or the selected modem 160 at step 334. Processor 116 updates activity table 122 at step 336 to indicate that the selected data line 54 is now active and that the selected modem 160 is now being used. Processor 116 directs activity detector 162 to initialize the inactivity interval for the selected modem 160 at step 338. Processor 116 then selects the next inactive and non-dedicated data line 54 in activity table 122 at step 316, and returns to step 304.

FIG. 9 is a flow chart of a method for monitoring and decoupling modems 160 due to inactivity. It should be understood that the methods described with reference to FIGS. 8 and 9 may be performed simultaneously or in alternative succession by processor 116 to couple and decouple data lines 54 with modems 160. The method begins at step 400 where processor 116 loads activity table 122 which contains an entry for each valid subscriber 12 served by communication server 58. Processor 116 selects a first active and non-dedicated data line 54 as indicated by the designation "A" in status column 202 of activity table 122 at step 402. Since switch 70 is configured to maintain a coupling between dedicated subscribers 12 and their dedicated modems 160, processor 116 need not select an active data line 54 that is also dedicated, as indicated by the designation "A/D" in status column 202.

Processor 116 retrieves timeout status for modem 160 associated with the selected active data line 54 from detector 162 using link 86 and input/output circuitry 118 at step 404.

Processor 116 determines if a timeout has occurred for the selected active data line 54 at step 408. If a timeout has not occurred, processor 116 selects the next active and non-dedicated data line 54 as indicated in status column 202 of activity table 122 at step 410, and returns to step 404.

If a timeout has occurred at step 408, processor 116 may communicate status or connection information to subscriber 12 associated with the selected active data line 54 using transceiver 108 or the associated modem 160 at step 412. Processor 116 generates a command to direct switch 70 to decouple the active data line 54 from its associated modem 160 at step 414. Processor 116 updates activity table 122 at step 416 to indicate that data line 54 is now inactive and that the associated modem 160 is available for another subscriber session.

Figure 10:
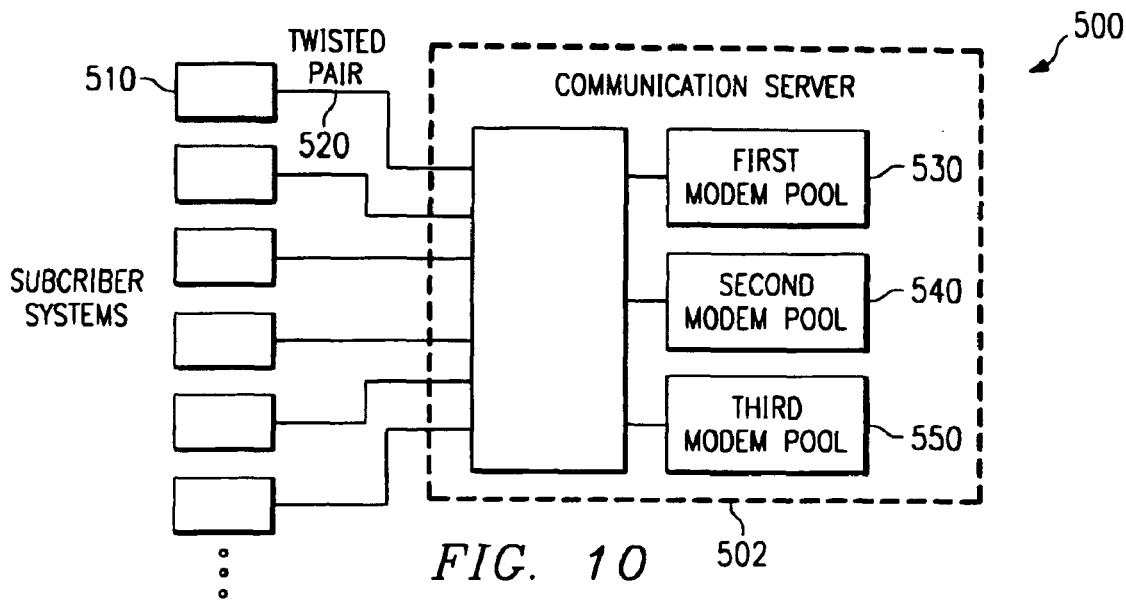
FIG. 10 illustrates a block diagram of an XDSL communication system providing different levels of subscriber service.

FIG. 10 illustrates a block diagram of an XDSL communication system indicated generally at 500, that provides different levels of subscriber service. Communication system 500 includes a communication server 502 coupled to subscriber systems 510 via twisted pair lines 520. Communication server 502 includes a first modem pool 530, a second modem pool 540 and a third modem pool 550. First modem pool 530, second modem pool 540 and third modem pool 550 all include a number of XDSL modems. The number of modems in each modem pool may differ, and the ratio of modems to subscriber systems 510 may also differ. In operation, communication server 502 detects requests for data service from subscriber systems 510. In response, communication server 502 selectively couples requesting subscriber systems 510 to an available XDSL modem in either first modem pool 530, second modem pool 540, or third modem pool 550 based on an availability guarantee value associated with each requesting subscriber system 510.

The availability guarantee value for each subscriber system 510 specifies a level of service to be provided to that subscriber system 510. The availability guarantee value can be assigned, for example, by an operator of communication server 502 based upon fees paid by subscribers. For example, a subscriber system 510 may be limited to available modems in first modem pool 530 if subscriber system 510 has an availability guarantee value that specifies the level of service provided by first modem pool 530. Similarly, a different availability guarantee value can specify connection to a modem in either the second modem pool 540 or the third modem pool 550. In one embodiment, a predetermined number of subscriber systems 510 have availability guarantee values that specify either first modem pool 530, second modem pool 540 or third modem pool 550. These numbers of subscriber systems 510 form a subscriber-to-modem ratio between subscriber systems 510 and the number of modems that are in each modem pool.

In one embodiment, the subscriber-to-modem ratio for first modem pool 530 is lower than the subscriber-to-modem ratio for second modem pool 540. In this embodiment, subscriber systems 510 that have an availability guarantee value that specifies the first modem pool 530 have an advantage in that, when they desire data service from the communication server 502, is they are more likely to have a modem available in first modem pool 530. This is because the ratio of the number of subscriber systems 510 that have an availability guarantee value that specifies first modem pool 530 is smaller than the ratio of the subscriber systems 510 that have an availability guarantee value that specifies second modem pool 540 to the number of modems in second modem pool 540.

In addition, third modem pool 550 may be structured such that it guarantees a subscriber system 510 a connection to a modem in all circumstances. In order to provide this capability, third modem pool 550 must include enough XDSL modems such that a one-to-one ratio exists between the number of modems and the number of subscriber systems 510 currently having an availability guarantee value that specifies third modem pool 550.

Subscriber systems 510 that normally have an availability guarantee value that specifies a lower level of service can be allowed to temporarily change their availability guarantee value for a session or for a specified period of time. This change can result in communication server 502 coupling the subscriber system 510 to a modem in first modem pool 530 rather than second modem pool 540. For example, a situation may exist where second modem pool 540 has all of its modems allocated to subscriber systems 510. In this situation, a new request for service from a subscriber system 510 may not be able to obtain access to a modem in second modem pool 540. The user who is experiencing this difficulty may be able to transmit a signal to communication server 502 that indicates a desire to temporarily change the availability guarantee value either for a predetermined time period or for a single user session. This change can be accompanied by the operator of communication server 502 charging an appropriate fee. Upon receiving this request, communication server 502 can connect the subscriber system 510 to an available modem in first modem pool 530, and thus provides the subscriber system 510 with a greater chance for obtaining a modem.

Situations may also arise where subscribers insist on having a modem immediately available and do not want any risk of waiting. If a subscriber system 510 does not have this availability guarantee value, the subscriber system 510 may transmit a signal to communication server 502 requesting access to third modem pool 550. Communication server 502 may upgrade the specific subscriber system 510 requesting access to third modem pool 550 such that the availability guarantee value of that subscriber system 510 is altered either for a single user session or a predetermined time period. It should be noted that when subscriber systems 510 request access to lower subscription modem pools, the allocation of XDSL modems may have to be altered or otherwise managed to maintain appropriate levels of service.

For example, first modem pool 530 may contain 50 XDSL modems, second modem pool 540 may contain 25 XDSL modems, and third modem pool 550 may contain 5 XDSL modems. In this situation, if 100 subscriber systems 510 have an availability guarantee value that specifies first modem pool 530, the subscriber-to-modem ratio for first modem pool 530 is 2:1. The number of subscriber systems 510 that have an availability guarantee value specifying second modem pool 540 can be equal to 250 such that the subscriber-to-modem ratio for second modem pool 540 is 10:1. Assuming third modem pool 550 provides guaranteed access to subscriber systems 510, no more than five subscriber systems 510 may have an availability guarantee value specifying third modem pool 550. For purposes of example it is assumed that, initially, three subscriber systems 510 have an availability guarantee value that specifies third modem pool 550.

In this example, if a subscriber system 510 has an availability guarantee value that normally specifies second modem pool 540, and the second modem pool 540 has a 10:1 subscriber-to-modem ratio, the subscriber system 510 may experience periods when there are no modems available in second modem pool 540. In this instance, the subscriber system 510 can send a signal to communication server 502 requesting to temporarily modify the availability guarantee value of subscriber system 510. The temporary modification allows the subscriber system 510 to qualify for first modem pool 530 or third modem pool 550. The modification can last for one session, a designated time period or other appropriate duration.

It should be understood that the embodiment illustrated in FIG. 10 can be modified to include different numbers of modem pools where each modem pool provides a different level of service for the subscriber systems. Each subscriber system in such a communication system can select an appropriate level of service, where varying levels of service are associated with varying subscriber fee, and can temporarily modify that level of service for an additional fee.

Figure 11:
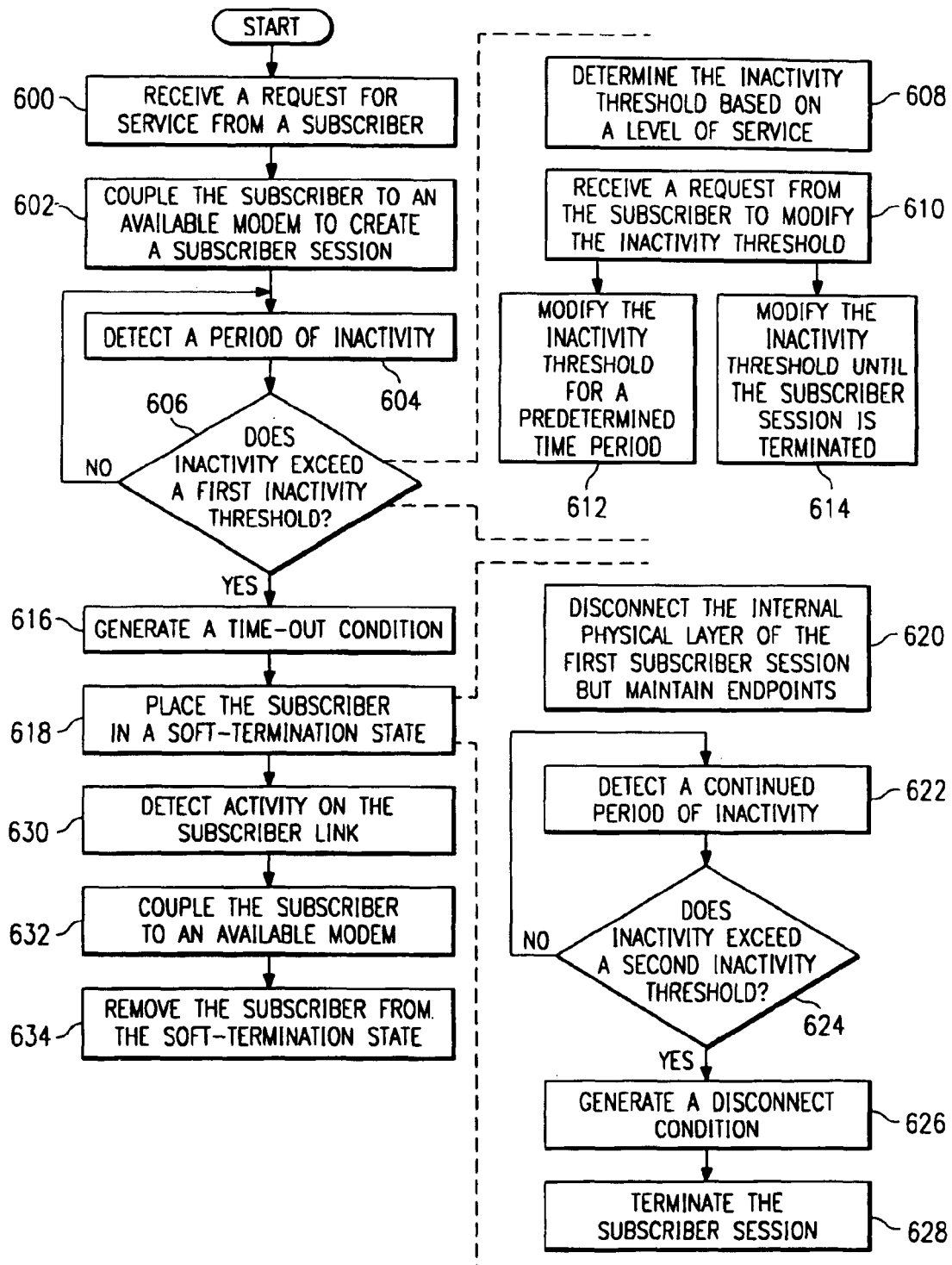
FIG. 11 is a flow chart of a method for performing an inactivity time-out in an XDSL communication system.

FIG. 11 is a flow chart of a method for performing an inactivity time-out in an XDSL communication system. At step 600, the communication server receives a request for service from a subscriber. Detection of this request may be accomplished using line interface components and detectors as described earlier. At step 602, the communication server couples the subscriber to an available modem in a modem pool to create a subscriber session. The subscriber session, for example, allows a subscriber link to be established between the subscriber and a network device. Once this connection has been established, the subscriber has access to the XDSL data path through the communication server.

At step 604, the subscriber session is monitored in order to detect a period of inactivity on the part of both the subscriber and the network device. A period of inactivity is marked by a period during which no data is transferred across the subscriber link. At step 606, the communication server identifies whether the period of inactivity exceeds a first inactivity threshold. The first inactivity threshold represents a period of time that has been designated to be excessive in terms of inactivity. An excessive period of inactivity is inefficient as oversubscribed resources are being unnecessarily tied-up. Step 606 may further include step 608 in which the first inactivity threshold is selected based on a level of service. Differing levels of service may be associated with different fees to the subscriber such that a subscriber who pays more will have a higher level of service and be allowed a longer period of inactivity before it is deemed excessive.

Steps 610, 612 and 614 provide an avenue for subscribers to alter the level of service temporarily. At step 610, the communication server receives a request from a subscriber requesting that the communication server modify the first inactivity threshold for the subscriber. Modification of the inactivity period may be done for various durations. In one case, at step 612, the modification is performed such that the first inactivity threshold for the subscriber can be extended for a predetermined time period. In another case, at step 614, the first inactivity threshold can be modified for one session and returns to normal when the subscriber session is terminated. Further, the first inactivity period could be turned off for the session such that the subscriber would not have to worry about the implications of long periods of inactivity.

At step 616, when the inactivity period has been determined to exceed the first inactivity threshold, a time-out condition is generated. At step 618, the subscriber is then placed in a soft-termination state. At step 620, placing the subscriber in the soft-termination state includes disconnecting the physical layer within the communication server for the subscriber session. In this soft-termination state, the communication server maintains a pseudo-connection with the subscriber such that, from the perspective of the subscriber, the connection has not been terminated. Similarly, the network device does not receive any indication that the physical connection has been removed between it and the subscriber. The soft-termination state allows the subscriber or network device to reinitiate a physical connection within the communication server and continue the session without the overhead associated with starting up a new session from a disconnected state. Further, it allows the communication server to avoid consumption of modems and other resources by inactive sessions.

At step 622, while in the soft-termination state, a continued period of inactivity on the part of the subscriber can be detected. At step 624, it is determined whether this continued inactivity exceeds a second inactivity threshold. In one embodiment, the second inactivity threshold is much greater than the first inactivity threshold. At step 626, if this second inactivity threshold is exceeded, a disconnect condition is generated. Then at step 628, the subscriber session is terminated. Once the subscriber session has been terminated, both the subscriber and the network device are notified that the session has been terminated. Additional steps are then needed in order to re-establish a subscriber session.

During the soft-termination state, at step 630, activity may be detected on the subscriber link. In one example, this activity encompasses a subscriber returning to his computer and attempting to transmit or receive data. Based on this activity, at step 632, the communication server couples the subscriber to an available modem from the modem pool. Note that the communication server may be unable to couple the subscriber to the initial modem because a second subscriber may have been granted service to that modem. Once a new connection has been established, the subscriber is removed from the soft-termination state in step 634, and the time-out condition associated with the subscriber is canceled.

Using the method of FIG. 11, the communication server can monitor subscriber sessions to determine when an extended period of inactivity has occurred. When such a period of inactivity is detected, the subscriber can first be placed into a soft-termination state. The soft-termination state gives the subscriber a period of time to resume the session without having to completely reconnect from both the perspective of the subscriber system and the network device. However, if the subscriber does not resume the session within a second period of inactivity, the communication server can hard-terminate the session.

In a system as that described above, a subscriber may determine that the inactivity thresholds associated with his level of service are inadequate. In such a situation, the subscriber may request a temporary upgrade to a different level of service such that longer periods of inactivity are allowed before being either placed in the soft-termination state or being terminated. In such a system, an appropriate fee may be associated with extending the inactivity thresholds.

Figure 12:
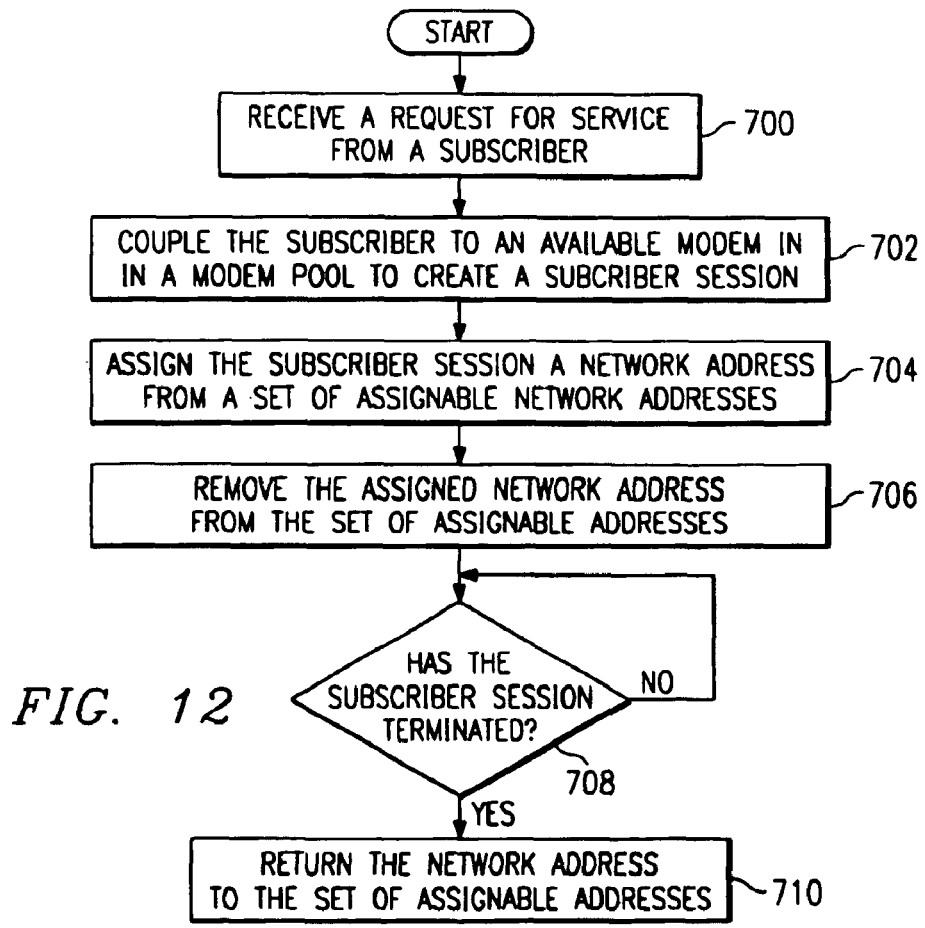
FIG. 12 is a flow chart of a method for dynamically allocating network addresses in an XDSL communication system.

FIG. 12 is a flow chart of a method for dynamically allocating network addresses in an XDSL communication system. Network addresses may include Internet protocol (IP) addresses or other types of network addresses. Using the method of FIG. 12, the set of network addresses assignable to subscribers can be smaller than the total number of subscribers. Network addresses are only distributed to a subscriber who has an active session. Thus, a subscriber may have a different network address each time a subscriber session is initiated.

At step 700 of FIG. 12, a request for service is received from a subscriber. At step 702, the subscriber is coupled to an available modem in a modem pool to create a subscriber session. At step 704, the subscriber session is assigned a network address from a set of assignable network addresses. In one embodiment, an information service provider (ISP) serviced by the communication server has a certain set of network addresses which it can distribute to individual subscribers as they initiate sessions. In this embodiment, the set of assignable addresses can be a subset of the complete set of network addresses that the ISP has available. At step 708, the assigned network address is removed from the set of assignable addresses. This ensures that the communication server does not issue the same network address to multiple subscribers.

At step 708, the communication server monitors the subscriber session and determines whether that session has terminated. When the session has terminated, the communication server, in step 710, returns the network address to the set of assignable addresses. Thus, the communication server maintains a set of assignable network addresses for each ISP or corporate network serviced by the communication server. When a subscriber session is initiated, a network address from an appropriate set of assignable addresses is assigned to the session. The network address assigned to that subscriber session is then removed from that set of assignable addresses. The network address is eventually returned to the set of assignable addresses when the particular subscriber session is terminated.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A digital subscriber line (XDSL) communication system, comprising:
    a plurality of subscriber systems each having an associated availability guarantee value;
    a first pool of modems having a first number of XDSL modems;
    a second pool of modems having a second number of XDSL modems; and
    a communication server coupled to the plurality of subscriber systems, the first pool of modems, and the second pool of modems, wherein the communication server selectively couples a subscriber system to an available modem in either the first pool of modems or the second pool of modems based upon the availability guarantee value associated with the subscriber system;
    wherein a first ratio of a number of the subscriber systems having an availability guarantee value specifying the first pool of modems to the first number of modems is smaller than a second ratio of a number of the subscriber systems having an availability guarantee value specifying the second pool of modems to the second number of modems.

2. The communication system of claim 1, wherein the first ratio is equal to one.

3. The communication system of claim 1, wherein the communication server is operable to modify the availability guarantee values associated with the subscriber systems.

4. The communication system of claim 3, wherein the communication server is further operable to allocate the modems between the first pool of modems and the second pool of modems in response to the modified availability guarantee values.

5. The communication system of claim 1, wherein the communication server is operable to modify the availability guarantee value associated with the subscriber system for a single subscriber session.

6. The communication system of claim 1, wherein the communication server is operable to modify the availability guarantee value associated with the subscriber system for a predetermined time period.

7. The communication system of claim 1, wherein the communication server is operable to modify the availability guarantee value associated with the subscriber system responsive to a request from the subscriber system.

8. The communication system of claim 1, wherein the communication server selectively couples the subscriber system to the available modem in response to a request for service from the subscriber system.

9. A method for providing digital subscriber line (XDSL) services comprising:
    determining an availability guarantee value assigned to a subscriber;
    selecting one of a first modem pool and a second modem pool based on the availability guarantee value, wherein the first modem pool comprises a first plurality of XDSL modems and the second modem pool comprises a second plurality of XDSL modems; and
    coupling the subscriber to a modem in the selected modem pool;
    wherein a first ratio of a number of subscriber systems having an availability guarantee value specifying the first pool of modems to the first number of modems is smaller than a second ratio of a number subscriber systems having an availability guarantee value specifying the second pool of modems to the second number of modems.

10. The method of claim 9, further comprising receiving a request for XDSL service from the subscriber.

11. The method of claim 9, wherein the first ratio is equal to one.

12. The method of claim 9, further comprising modifying the availability guarantee value associated with the subscriber system for a single subscriber session.

13. The method of claim 9, further comprising modifying the availability guarantee value associated with the subscriber system for a predetermined time period.

14. The method of claim 9, further comprising modifying the availability guarantee value associated with the subscriber system responsive to a request from the subscriber system.

15. A method for connecting to a digital subscriber line (XDSL) communication server comprising:
    requesting XDSL service from an XDSL communication server having a first modem pool and a second modem pool;
    receiving XDSL service from the communication server based upon an assigned availability guarantee value, wherein the assigned availability value specifies a selected one of the first modem pool and the second modem pool; and
    requesting to modify the assigned availability guarantee value;
    wherein:
        the first modem pool comprises a first number of modems;
        the second modem pool comprises a second number of modems; and
        a first ratio of a number of subscriber systems having an availability guarantee value specifying the first pool of modems to the first number of modems is smaller than a second ratio of a number subscriber systems having an availability guarantee value specifying the second pool of modems to the second number of modems.

16. The method of claim 15, wherein requesting to modify the assigned availability guarantee value comprises requesting to modify the assigned availability guarantee value for a single subscriber session.

17. The method of claim 15, wherein requesting to modify the assigned availability guarantee value comprises requesting to modify the assigned availability guarantee value for a predetermined time period.

18. The method of claim 15, wherein the first ratio is equal to one.

19. A digital subscriber line (XDSL) communication server comprising:
   a first pool of modems having a first number of XDSL modems;
   a second pool of modems having a second number of XDSL modems; and
   an interface coupled to the first pool of modems and the second pool of modems, wherein the interface selectively couples a subscriber system to a modem in either the first pool of modems or the second pool of modems based upon an availability guarantee value associated with the subscriber system;
   wherein a first ratio of a number of subscriber systems having an availability guarantee value specifying the first pool of modems to the first number of modems is smaller than a second ratio of a number subscriber systems having an availability guarantee value specifying the second pool of modems to the second number of modems.

20. The communication server of claim 19, wherein the first ratio is equal to one.

21. The communication server of claim 19, operable to modify the availability guarantee value associated with the subscriber system for a single subscriber session.

22. The communication server of claim 19, operable to modify the availability guarantee value associated with the subscriber system for a predetermined time period.

23. The communication server of claim 19, operable to modify the availability guarantee value associated with the subscriber system responsive to a request from the subscriber system.

24. The communication server of claim 19, wherein the interface selectively couples the subscriber system to the available modem in response to a request for service from the subscriber system.

25. A digital subscriber line (XDSL) communication server comprising:
   means for determining an availability guarantee value assigned to a subscriber;
   means for selecting one of a first modem pool and a second modem pool based on the availability guarantee value, wherein the first modem pool comprises a first plurality of XDSL modems and the second modem pool comprises a second plurality of XDSL modems; and
   means for coupling the subscriber to a modem in the selected modem pool;
   wherein a first ratio of a number of subscriber systems having an availability guarantee value specifying the first pool of modems to the first number of modems is smaller than a second ratio of a number subscriber systems having an availability guarantee value specifying the second pool of modems to the second number of modems.

26. The communication server of claim 25, further comprising means for receiving a request for XDSL service from the subscriber.

27. The communication server of claim 25, wherein the first ratio is equal to one.

28. The communication server of claim 25, further comprising means for modifying the availability guarantee value associated with the subscriber system for a single subscriber session.

29. The communication server of claim 25, further comprising means for modifying the availability guarantee value associated with the subscriber system for a predetermined time period.

30. The communication server of claim 25, further comprising means for modifying the availability guarantee value associated with the subscriber system responsive to a request from the subscriber system.

* * * * *